July 24, 1962     H. W. KERN     3,045,735
METHOD OF MAKING FASTENING ELEMENT DESIGNED FOR WELDING
Filed July 12, 1954     3 Sheets-Sheet 1
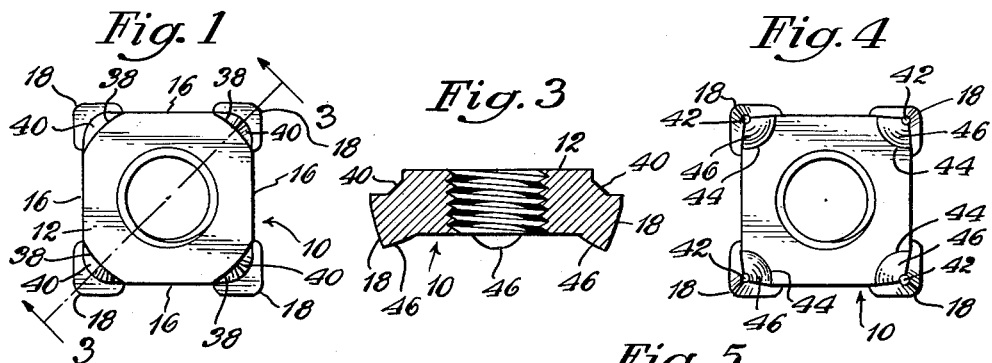
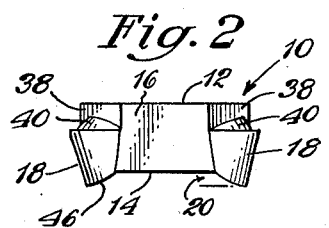
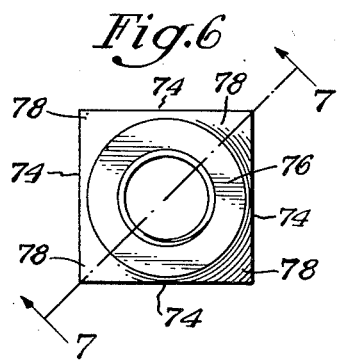
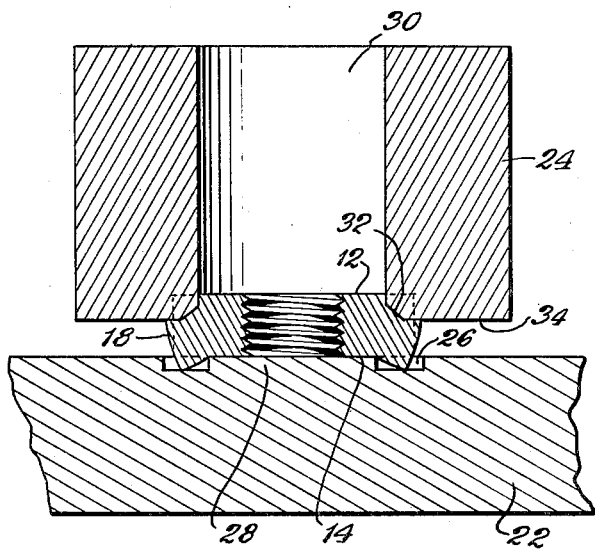
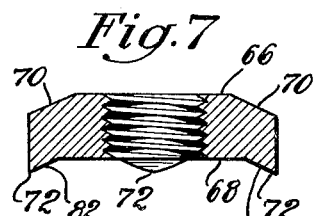
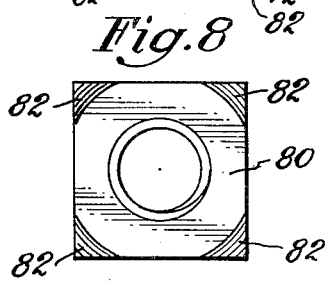
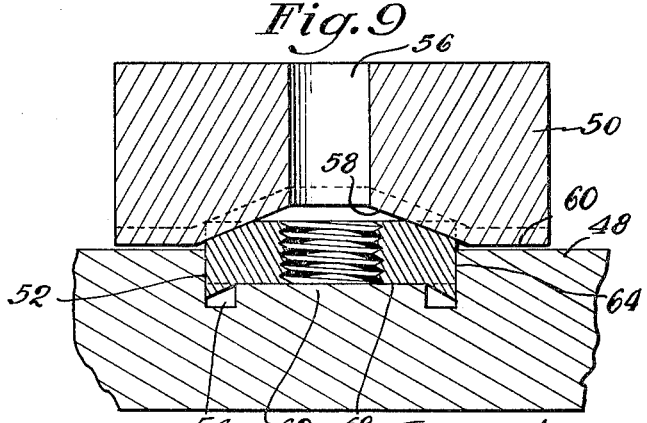
Inventor
Henry W. Kern
by Parker & Carter
Attorneys

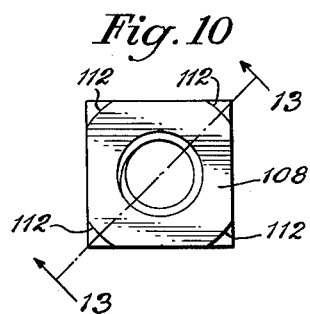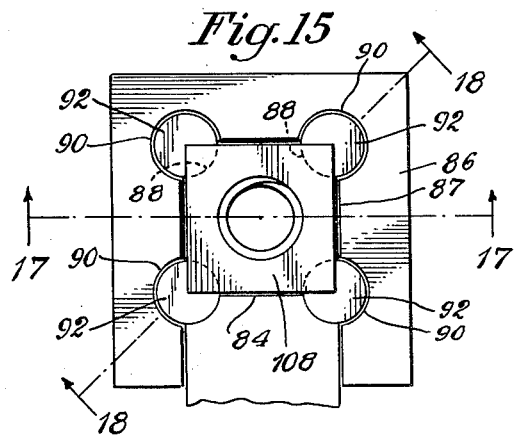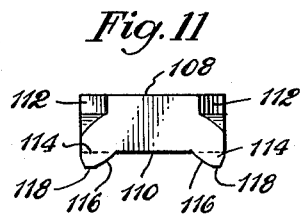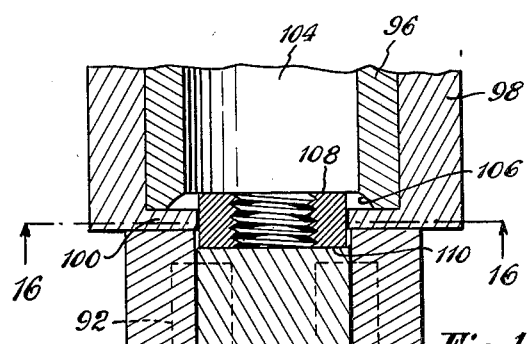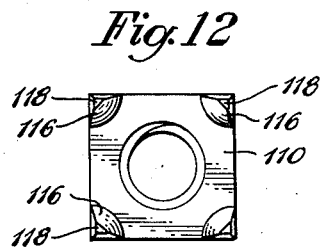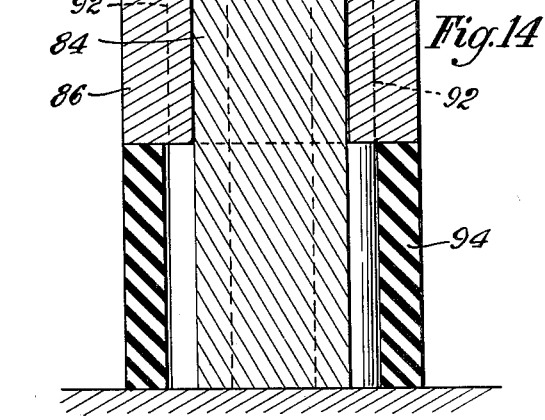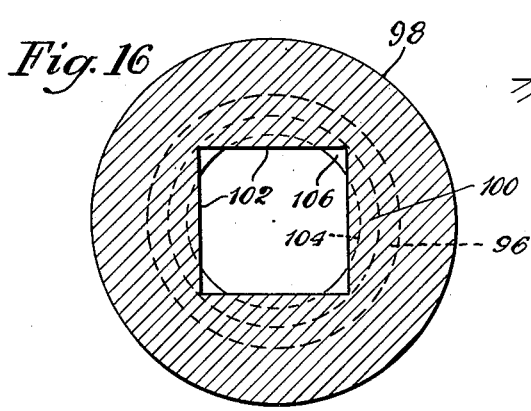

July 24, 1962          H. W. KERN          3,045,735
METHOD OF MAKING FASTENING ELEMENT DESIGNED FOR WELDING
Filed July 12, 1954          3 Sheets-Sheet 3
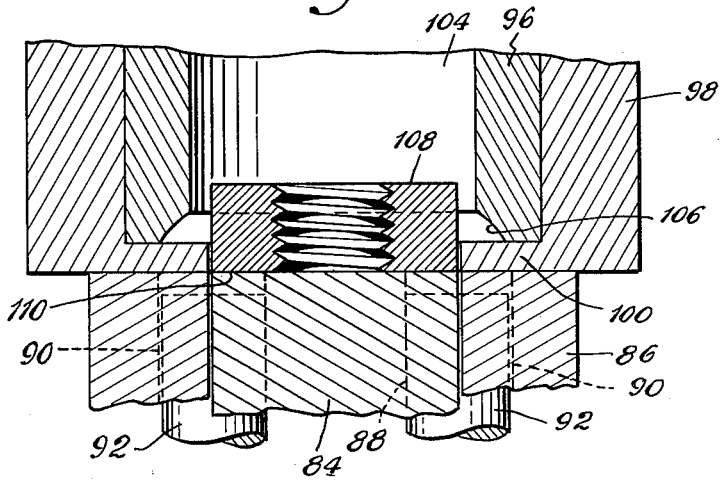
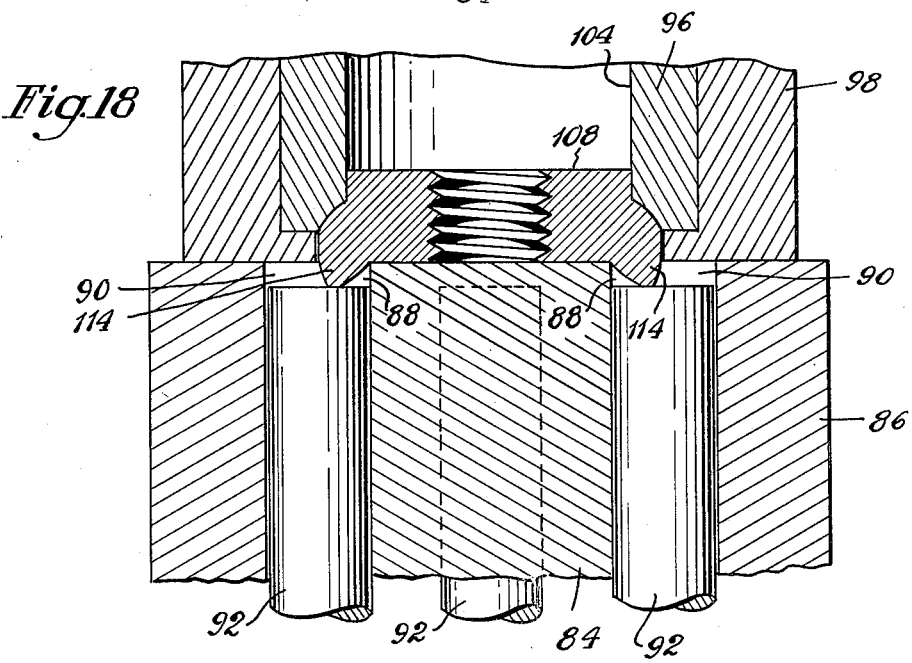
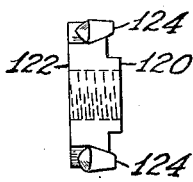 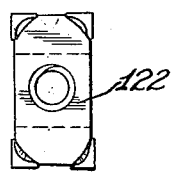
Inventor
Henry W. Kern
by Parker & Carter
Attorneys United States Patent Office 3,045,735
Patented July 24, 1962

3,045,735
METHOD OF MAKING FASTENING ELEMENT
DESIGNED FOR WELDING
Henry W. Kern, East Detroit, Mich., assignor to
Earl E. Howe, Chicago, Ill.
Filed July 12, 1954, Ser. No. 442,478
5 Claims. (Cl. 151—41.7)

This is a continuation-in-part of application Serial No. 121,877, filed October 17, 1949, and now abandoned.

This invention resides in the field of securing or connecting elements, and is more specifically a method of forming or producing weld elements. It also relates to the weld or securing element produced by the method.

A primary object of my invention is a new and improved method of making weld elements, specifically weld nuts.

Another object of my invention is a method of making weld nuts so that the resulting nut will have welding projections formed on it and, at the same time, will have its original dimensions so that the resulting nut can be hopper fed.

Another object of my invention is a method of forming a weld nut so that welding projections will extend axially beyond only one face.

Another object of my invention is a method of forming weld nuts by a single application of pressure to produce welding projections with slightly blunted tips.

Another object of my invention is a method of producing all types of weld nuts; for example, flat nuts from standard nut blanks, or pilot nuts from a special rolled section so that substantial lateral deformation is prevented at the corners.

Another object of my invention is a weld nut or securing element of any type with welding projections formed by a single application of pressure so that the metal at the projections is deformed axially, and not laterally to any substantial degree.

Other objects will appear from time to time in the ensuing specification and drawings in which:

FIGURE 1 is a top view of a weld nut with axial welding projections formed at the corners;

FIGURE 2 is a side view of the nut shown in FIGURE 1;

FIGURE 3 is a sectional view taken along line 3—3 in FIGURE 1;

FIGURE 4 is a bottom view of the nut shown in FIGURE 1;

FIGURE 5 is a side sectional view of the die mechanism for forming the nut of FIGURES 1 through 4;

FIGURE 6 is a top view of a modified form of the nut shown in FIGURE 1;

FIGURE 7 is a sectional view taken along the line 7—7 of FIGURE 6;

FIGURE 8 is a bottom view of the nut shown in FIGURE 6;

FIGURE 9 is a sectional view of the die mechanism for forming the nut shown in FIGURES 6 through 8;

FIGURE 10 is a top view of a modified form of my weld nut;

FIGURE 11 is a side view of the nut shown in FIGURE 10;

FIGURE 12 is a bottom view of the nut shown in FIGURE 10;

FIGURE 13 is a sectional view taken along line 13—13 of FIGURE 10;

FIGURE 14 is a sectional view of the die mechanism for forming the nut shown in FIGURE 10;

FIGURE 15 is a top view of the lower die mechanism with the nut of FIGURES 10 through 13 positioned at the working station;

FIGURE 16 is a sectional view taken along line 16—16 of FIGURE 14;

FIGURE 17 is a sectional view taken along the line 17—17 of FIGURE 15;

FIGURE 18 is a sectional view taken along the line 18—18 of FIGURE 15; FIGURE 19 is a side view of a modified form of the nut; and FIGURE 20 is a top view of FIGURE 19.

In FIGURE 1 I have shown a nut body 10 which has generally flat end surfaces 12 and 14, generally parallel to each other, and intersecting side surfaces 16. Welding projections 18 have been formed at the corners so that they extend axially beyond the end surface 14 a predetermined distance, indicated at 20. The corners are formed in the configurations shown in FIGURES 1 through 4 by a suitable die mechanism shown in FIGURE 5 composed of a lower die 22 and an upper die 24. The lower die has a grooved channel 26 or a plurality of recesses formed in its face so as to provide a center supporting post 28. The edges of the substantially square nut blank, shown in dotted lines in FIGURE 5, overlie the recesses or grooves so that they are unsupported. The corners of the blank are struck on the upper surface by the upper die and are displaced axially into the recesses or groove to form welding projections.

I need not necessarily provide a grooved channel nor need the channel have any special configuration. It is only necessary to provide slots or pockets under the four corners of the nut so that the corners will be unsupported. Thus, when axial pressure is brought to bear on the nut corners on the upper surface 12, the metal at the corners can be displaced axially a predetermined distance.

The upper die 24 has a cylindrical opening or channel 30 so that the main or center portion of the nut will not be engaged and worked by the die. The center part of the nut body can move up into the center post as the corners are being forced downwardly. The inner edge of the upper die is beveled as at 32 in a conical configuration so that the metal will be progressively worked, first at the tips and then inwardly toward the threaded bore.

The upper die is of such a size and its relative dimensions are such in relation to the size of the nut blank that the metal at the corners of the blank will be acted upon by the conical surface 32 and also by the relatively lower flat face 34 of the die.

The depth of the groove, slots or channels 26 is such, in relation to the pressure applied by the upper die, that the metal of the blank at the corners will contact the bottom of the groove. Thus the tips or points of the projections will be blunted or slightly flattened.

Any suitable type of punch, or knockout, of course, can be provided in the opening 30 in the upper die.

The finished nut is shown in FIGURES 1 through 4. The welding projections extend axially beyond the end face 14 a predetermined distance 20 which, of course, is the depth of the channel or groove 26. Four somewhat arcuate vertical surfaces 38 are formed at the corners of the nut by the opening 30 in the upper die. Each of the corners has a conical portion 40 which is formed by the conical abutting surface 32 on the upper die. The extremity or tip of each welding projection is blunted and has a flat surface 42 which improves the welding efficiency of the nut.

Each of the welding projections departs from the bottom face 14 in an arcuate configuration 44 as shown in FIGURE 4 and the sloping surface 46 of each welding projection has a somewhat conical shape. This can be provided by merely milling circular depressions in the lower die underneath the corners, and as the material at the corners flows under pressure into these depressions, the edge 44 will take on an arcuate configuration. This forces a conical sloping surface on the underside of each projection.

As shown in FIGURES 1 and 4, the material at the corners is not restrained in a lateral direction and it will flow a certain distance beyond the side faces. In certain types of application this nut is the most advantageous; however, it cannot be used in standard hopper feeding equipment because the overall dimensions of the finished nut exceed the original dimensions of the standard nut blank.

For this reason, I have found it advantageous to restrict the lateral flow of the nut. For example, in FIGURES 6 through 9 I show another form of my invention in which a standard nut body has been supported between dies 48 and 50 and subjected to axial pressure. The lower die 48 is milled with a square opening 52 conforming in size generally to the dimensions of a standard nut blank. Deeper slots 54 are milled under each of the corners so that they will not be supported when the upper die applies axial pressure to the corners. The upper die has a center opening 56 and a conical or beveled engaging surface 58 which extends outwardly beyond the outsides of the nut and terminates in a blunt face 60. In FIGURE 9 I have shown the die and nut, in dotted lines, in which the upper die has just engaged the standard nut blank. In full lines the nut has been shown with the dies at the end of a die press operation.

In effect the lower die provides a vertical or center circular post 62 under the nut, with the corners being unsupported, and a confining wall 64 around the sides of the nut so that the material at the corners and on the sides adjacent the corners and between them cannot flow laterally.

Thus a nut is formed which has welding projections extending beyond one end face, but the nut retains its original dimensions. In FIGURES 6, 7, and 8 the nut is shown with end faces 66 and 68 with the corners beveled down as at 70 on the upper face, with welding projections 72 extending at the corners from the opposite face. The sides 74 retain their original dimensions. A nut formed in this manner has an annular flat surface 76 on its upper face with beveled-down portions or areas 78 at each corner. I have shown in FIGURE 6 that these beveled surfaces interconnect. However, this is not necessary as the annular flat surface 76 could overlap the sides. This, of course, is dependent upon the amount of pressure that is applied to the nut blank, the slope of the conical surface 58 of the upper die, and the amount that the projections are worked beyond the end face.

The bottom end surface takes on a flat annular configuration 80 which laps over each side and has conical portions 82 sloping into welding projections at each corner.

While I have shown these corners as relatively sharp, I could form the grooves under each of the corners a little shallower so that the tips at the corners would be blunted by engagement with the bottom plane of the groove in a manner similar to the formation of the nut in FIGURES 1 through 5.

In FIGURE 9 the lower die could be provided with any sort of a piloted knockout, if desired, and I have not shown this feature for clarity.

A nut such as shown in FIGURES 6 through 9 has definite advantages. First, it retains its original configuration and dimensions, and it can be easily used in hopper feeding equipment. Secondly, the points can be sharp or blunted. However, blunting the points is preferable because it prevents the nut from rocking when it is to be secured on a plate, and it also prevents sparking and arcing as current flows through the nut caused by concentration at one high point.

I also find it advantageous to combine several features from each of these nuts and I have shown this combination in FIGURES 10 through 13.

In FIGURES 14 and 15 I show the mechanism for forming a further modification of the nut. It includes a center supporting post 84 which is rigidly grounded. A three-sided pad element 86 surrounds the post and rises slightly above it to form a three-sided pocket 87, as shown in FIGURE 14, so that a standard nut blank can be accurately positioned in the pocket. The post is milled out at the pocket under each of the corners of the nut at 88, and the pad is also milled out under each of the corners at 90 so that pins 92 can be inserted into vertical channels. The pins have their upper surfaces slightly spaced a predetermined distance below the upper surface of the post, as shown in FIGURE 18. This spacing accurately determines the distance that the welding projections extend beyond the end face of the nut.

The pad is supported on any suitable resilient element 94 so that it can move up and down above and below the face of the post. Normally it rises just slightly above the face of the post to the position shown in FIGURE 14.

The upper die mechanism includes a die member 96 surrounded by a cage 98 which has inwardly directed flanges 100 defining a relatively square opening 102. The size of this opening is such that it will fit rather snugly down over the nut blank.

The die has a central opening 104 with a milled conical working surface 106. This working surface 106 overlies the corners of the nut as shown in FIGURE 16 and when the upper die mechanism is brought down it engages these corners and forces them down into the grooves or slots formed by the post and the pins. Sufficient pressure is applied to force the corners down until the welding tips formed thereon abut the pins 92 and are blunted.

In operation the upper die moves downwardly and the cage engages the pad and forces it down compressing the resilient elements. The die inside of the cage then engages the upper surface of the nut blank as it extends through the square opening 100 and forms the corners into welding projections.

With this type of die structure the pins can be removed and replaced or resurfaced as their abutting upper surface becomes worn. Thus the post does not need to be replaced or resurfaced, only the pins. As the surface of the pins wears away, they can, of course, be shimmed properly from below, in any suitable manner, to raise them and maintain the predetermined distance between their upper surface and the upper surface of the post so that the welding projections will be uniform in height.

I have shown the resulting nut in FIGURES 10 through 13. The end surfaces 108 and 110 are relatively smooth. The corners are pushed down to provide cylindrically shaped, disconnected, side surfaces 112 which slope into welding projections 114. The projections have conical undersurfaces 116 because conical pits are provided under each corner. Each welding projection has a blunt tip 118 to insure efficient welding. It should be noted that the nut retains its original dimension and it can be easily hopper fed. The upper surface is relatively smooth and any suitable electrode can be pressed against it without fusing to it.

In FIGURES 17 and 18 I have shown the dies in their closed position at the end of a die press operation. The square opening formed in the cage confines the nut and provides, in essence, four blunt confining walls to prevent any substantial lateral deformation of the material at the corners or around the sides. At the same time, the metal can be worked axially at each of the corners as it is unsupported, but the distance of its axial displacement is determined by the distance that the pins are displaced below the post's surface.

A knockout could be provided in the post, if desired, however I have found that it is not necessary. The resulting nut is quickly and easily manufactured by one single application of pressure. It can be hopper fed; it retains its original dimensions; excellent welding projections are formed at each of the corners; and each of the projections are tied to the body of the nut by a substantial amount of material so that the entire nut body will fuse efficiently to the surface to which it is welded. The tips will not break off. The height or axial extension of each of the welding projections can be uniformly regulated and quickly determined by shimming the posts. The nut blank can be quickly and easily positioned in and removed from the pocket formed by the post and pad.

In the three examples of the nuts given previously and the method of making them, I have in each case shown the weld nut formed from a standard nut blank. This means that the blank is generally square, has parallel generally flat end surfaces with relatively well defined sharp corners.

My method can, of course, be applied to other types of blanks. In FIGURES 19 and 20 I have shown a specially formed blank to which my method has been applied. This blank is made from a rolled section similar to the type shown in Patent No. 2,110,039. A nut blank of this type can be supported on a conventional post which has an upper surface formed to accept the pilot portion 120. The upper die strikes the upper surface 122 of the nut blank to form downwardly extending welding projections 124 at each of the corners. The pins would be adjusted so that the projections would not extend too far beyond the end surface. They should lie slightly back from the plane of the pilot so that the pilot can be inserted in an opening before the welding projections engage the surface of the plate. At the same time a post and pin structure, similar to that shown in FIGURES 14 and 15 can be used to accurately determine the distance that these projections extend and also blunt the points to acquire a more efficient weld.

It should be understood that the special rolled section type nut shown in FIGURES 19 and 20 can also be formed into a weld nut in a manner similar to that shown and described in FIGURES 5 and 9. A suitable confining wall can also be provided to restrict the lateral flow so that a nut of this type would retain its original dimensions and could be used in suitable hopper feeding equipment, although in the rectangular shape shown in FIGURES 19 and 20 this is problematical. In this connection the nut in FIGURES 19 and 20 could be generally square, rather than rectangular.

The use, operation and function of my invention are as follows:

I have shown and described a method and an apparatus for forming a special type of connecting element, and I have also shown and described the element resulting therefrom. I am concerned with a weld element, specifically a weld nut. I have shown my method as being applied to nut blanks, either standard nut blanks or blanks cut from special rolled sections having a pilot element thereon. The method could also be applied to the heads of studs or bolts and this would only require that the supporting mechanism be changed to accommodate the projecting threaded stud. The resulting nut retains its original dimension so that it can be used in standard hopperfeeding equipment. The corners extend beyond the end surfaces and the tips can be blunted so that current flowing through the nut will not concentrate at one corner. In all cases the nut is formed by a single quick application of pressure.

The projections formed at each corner extend axially a predetermined distance, and any lateral deformation or flow can be restricted or eliminated. This should be interpreted to include both nuts and studs as the method can be applied equally well to either. The term axial, of course, refers to the axial direction of the bore in the case of a nut, or the direction of the shank in the case of a bolt. Lateral is at 90 degrees to axial and refers to the direction of extension of the sides of the blank.

I claim:

1. A method of making a weld element from a discrete polygonal sided blank having substantially parallel flat end surfaces and generally flat plane side surfaces intersecting each other to form corners and wherein said side surfaces are normal to said end surfaces, said method including the steps of supporting one end surface of the blank except at localized areas adjacent and under the corners of said one end surface, uniformly applying axial pressure against the other end surface only at the corners thereof to deform the corner material axially and at the same time that said axial pressure is being applied, applying lateral restraining pressure by surrounding the side surfaces with a confining wall to substantially preclude lateral flow of the blank material, increasing the areas of applied pressure at each corner inwardly in a uniform manner toward the center, and, at the same time maintaining the lateral restraining pressure on the blank at least at the corners to prevent substantial lateral deformation so as to displace said corners of said one end surface axially beyond such one end surface to form axially disposed welding projections at the periphery of the blank, and discontinuing the applied axial pressure when such axially disposed welding projections have been formed at each corner without substantial lateral deformation from the original dimensions of the blank, all while maintaining said side surfaces essentially normal to the original planes of said blank end surfaces and the end surfaces at the center of the weld element between such original planes.

2. A method of making a weld element by a single application of pressure from a discrete polygonal sided blank having substantially parallel flat end surfaces and generally flat plane side surfaces intersecting each other to form corners and wherein said side surfaces are normal to said end surfaces, said method including the steps of supporting one end surface of the blank while leaving localized areas adjacent and under the corners of said one end surface unsupported, initially applying axial pressure against the other end surface only at the corners thereof to deform the corner material axially while at the same time applying lateral restraining pressure by surrounding the side surfaces with a confining wall to substantially preclude lateral flow of the blank material, increasing the areas of applied pressure at each corner inwardly in a uniform manner toward the center, and, at the same time maintaining the lateral restraining pressure on the blank at least at the corners to prevent substantial lateral deformation so as to displace said corners of said one end surface axially beyond such one end surface to form axially formed welding projections which project axially beyond and slope away from such end surface of the blank at the center thereof, and discontinuing the applied axial pressure when such axially disposed welding projections have been formed at each corner without substantial lateral deformation from the original dimentions of the blank, all while maintaining said side surfaces essentially normal to the original planes of said end surfaces, and without cold working or displacing the metal at the center of the blank.

3. The method of claim 2 including the step of forming the blank to provide a pilot element on the said one side and in which the axial pressure is applied on the other side to form the said projections adjacent the pilot element.

4. A method of forming a polygonal weld element having a generally axially disposed bore from a discrete blank having substantially parallel generally flat end surfaces and a peripheral surface normal to and intersecting said end surfaces to form meeting edges therewith, said method including the steps of supporting one end surface of the blank while leaving a plurality of spaced localized areas of predetermined extent of such surface adjacent the edge thereof unsupported, simultaneously and uniformly applying axial pressure of metal deforming intensity against only those parts of the other end surface opposite said unsupported areas, uniformly increasing the areas of pressure applied to said other end surface inwardly toward the center of the blank and at the same time that such axial pressure is being applied, resisting lateral displacement of said edge areas outwardly of the peripheral surface of the blank so as to axially displace the metal of the blank at said edge areas to form spaced essentially axially disposed projections without increasing the axial dimension of said blank between said unsupported areas and without materially increasing the overall lateral dimension of said blank, discontinuing the applied axial pressure when an amount of pressure has been applied sufficient to deform the spaced projections a predetermined axial distance beyond the said one surface so as to form a weld element having a plurality of uniform welding projections on one surface of said weld element at the corners thereof and essentially within the area defined by the peripheral surface of said blank and so that the tips of said projections will lie in a common plane and closer to the periphery than to the center of the blank, said method being characterized in that said axial pressure is applied while maintaining the peripheral surface normal to the planes of the original end surfaces of the blank.

5. A method of making a polygonal weld element by a single application of pressure from a discrete polygonal sided blank having substantially parallel flat end surfaces and generally flat plane side surfaces intersecting each other to form corners and wherein said side surfaces are normal to said end surfaces and said blank is provided with an axially disposed threaded central bore extending between such end surfaces, said method including the steps of supporting one end surface of the blank except at localized areas adjacent and under the corners of said one end surface, simultaneously and uniformly applying axial pressure against the other end surface only at the corners thereof to deform the corner material axially while at the same time applying lateral restraining pressure by surrounding the side surfaces with a confining wall to substantially preclude lateral flow of the blank material, increasing the areas of applied pressure at each corner inwardly in a uniform manner toward the center, and, at the same time maintaining the lateral restraining pressure on the blank at least at the corners to prevent substantial lateral deformation so as to displace said corners of said one end surface axially beyond such one end surface to form axially formed welding projections which project axially beyond and slope away from such end surface of the blank at the center thereof, while maintaining such end surface at the center thereof against deformation and below the tips of said welding projections, and discontinuing the applied axial pressure when such axially disposed welding projections have been formed at each corner without substantial lateral deformation from the original sides of the blank, all while maintaining said side surfaces essentially normal to the original planes of said end surfaces and the spacing between the end surfaces of the weld element within the limits of the spacing between the original end surfaces of the blank.

References Cited in the file of this patent

UNITED STATES PATENTS

| Re. 23,826 | Howe | May 11, 1954 |
| 1,137,291 | Schade | Apr. 29, 1915 |
| 2,096,623 | Almdale | Oct. 19, 1937 |
| 2,278,025 | Sadoski | Mar. 31, 1942 |
| 2,612,647 | Howe | Oct. 7, 1952 |
| 2,676,680 | Kindorf | Apr. 27, 1954 |

FOREIGN PATENTS

| 844,137 | Germany | May 21, 1952 |
| 498,549 | Canada | Dec. 22, 1953 |